United States Patent [19]

Satoh et al.

[11] Patent Number: 5,681,891

[45] Date of Patent: Oct. 28, 1997

[54] METHOD FOR PRODUCING A POLYCHLOROPRENE LATEX

[75] Inventors: Mikitoshi Satoh; Masao Koga, both of Niigata-ken; Shigeru Nagasawa, Hasuda; Kunihiko Asano; Toshiyuki Uenoyama, both of Urawa; Kunihiro Onishi, Konosu, all of Japan

[73] Assignees: Denki Kagaku Kogyo Kabushiki Kaisha, Tokyo; Konishi Co., Ltd., Osaka, both of Japan

[21] Appl. No.: 588,653

[22] Filed: Jan. 19, 1996

Related U.S. Application Data

[63] Continuation of Ser. No. 325,079, Oct. 19, 1994, abandoned.

[30] Foreign Application Priority Data

Oct. 19, 1993 [JP] Japan .................................. 5-283906

[51] Int. Cl.⁶ ........................................................ C08K 3/20
[52] U.S. Cl. ........................................................ 524/767
[58] Field of Search ............................................. 524/767

[56] References Cited

U.S. PATENT DOCUMENTS 5,200,459  4/1993  Weih et al. ............................. 524/767

FOREIGN PATENT DOCUMENTS 0 451 998  10/1991  European Pat. Off. .

OTHER PUBLICATIONS

Chemical Abstracts, vol. 108, No. 6, AN–39370, Feb. 8, 1988.

*Primary Examiner*—Peter D. Mulchay
*Attorney, Agent, or Firm*—Oblon, Spivak, McClelland, Maier & Neustadt, P.C.

[57] ABSTRACT

A method for producing a polychloroprene latex, which comprises copolymerizing chloroprene and an ethylenically unsaturated carboxylic acid in the presence of a polyvinyl alcohol, wherein a glycol ether is also present during the copolymerization.

10 Claims, No Drawings

METHOD FOR PRODUCING A POLYCHLOROPRENE LATEX

This application is a Continuation Ser. No. 08/325,079, filed on Oct. 19, 1994, now abandoned.

The present invention relates to a method for producing a polychloroprene latex useful as an adhesive. More particularly, it relates to a method for producing a polychloroprene latex which is excellent in the contact property (initial adhesive strength), water resistance, etc. and which is suitable for use as an aqueous contact-adhesive.

Heretofore, adhesives using polychloroprene as the base material were mainly of a solvent type. However, in recent years, solvent type adhesives have been disfavored in view of such problems as the toxicity, the danger of fire and the environmental pollution by the organic solvents during their production or use, and demand for non-solvent type adhesives has been increasing.

A polychloroprene latex adhesive has good adhesive properties and is free from the above problems, since it requires no organic solvent such as toluene or hexane during its production. Accordingly, it is expected to be a substitute for conventional solvent-type adhesives.

Such a polychloroprene latex adhesive is coated on both objects to be bonded, and the resulting adhesive layers will then be substantially dried and then bonded to each other, whereby it provides a high initial adhesive strength immediately after the bonding.

By virtue of such a feature, the adhesive of this type is practically used as an aqueous contact-adhesive. As the range of its application expands, improvement of the adhesive properties such as the contact property and water resistance has been increasingly demanded.

Japanese Unexamined Patent Publication No. 22047/1975 and EP 0451998 A2 disclose latexes obtained by polymerizing chloroprene and an unsaturated carboxylic acid in the presence of a polyvinyl alcohol. However, latexes prepared in accordance with Examples given in these publications, are not necessarily satisfactory with respect to their water resistant adhesive strength.

The water resistance of the product bonded by a latex adhesive usually decreases by the presence of a hydrophilic material such as an emulsifier contained in the latex. In the above case, it is known that the decrease of the water resistance can be controlled by reducing the amount of the polyvinyl alcohol incorporated during the production of the latex. However, in the above-mentioned method, it tends to be difficult to produce a stable latex if the amount of polyvinyl alcohol is reduced, and it has been difficult to obtain a latex satisfying both the stability and the water resistance.

It is an object of the present invention to solve such problems of the prior art and to provide a method for producing a polychloroprene latex which is excellent in the contact property and the water resistant adhesive strength, while securing the stability of the latex.

The present inventors have found it possible to improve the contact property and the water resistant adhesive strength of a polychloroprene latex adhesive, while securing the stability of the latex, by conducting polymerization in the co-existence of a certain specific compound during the production of a polychloroprene latex.

That is, the present invention provides (1) a method for producing a polychloroprene latex, which comprises copolymerizing chloroprene and an ethylenically unsaturated carboxylic acid in the presence of a polyvinyl alcohol, wherein a glycol ether is also present during the copolymerization.

More specifically, it provides (2) the method for producing a polychloroprene latex according to (1), wherein from 0.5 to 10 parts by weight of the ethylenically unsaturated carboxylic acid, from 0.5 to 10 parts by weight of the polyvinyl alcohol and from 0.5 to 15 parts by weight of the glycol ether are present per 100 parts by weight of the chloroprene, (3) the above-mentioned method for producing a polychloroprene latex, wherein the ethylenically unsaturated carboxylic acid is methacrylic acid, the polyvinyl alcohol has an average degree of polymerization of from 200 to 3,000 and a saponification degree of at least 70 mol %, and the glycol ether is a glycol monoether and/or a glycol diether, and (4) the above-mentioned method for producing a polychloroprene latex, wherein the glycol monoether is at least one member selected from the group consisting of 3-methyl-3-methoxy-1-butanol, 3-methoxy-1-butanol and ethylene glycol monobutyl ether, and the glycol diether is at least one member selected from the group consisting of ethylene glycol dimethyl ether, ethylene glycol dibutyl ether and triethylene glycol dibutyl ether. Further, the present invention provides (5) the above-mentioned method for producing a polychloroprene latex, wherein the chloroprene contains at most equimolar amount of 2,3-dichlorobutadiene.

Now, the present invention will be described in detail.

In the present invention, as the main material, chloroprene or a mixture of chloroprene with other monomer copolymerizable with chloroprene (hereinafter referred to as "a mixture of chloroprene with a monomer"), is employed.

Said other monomer may be any monomer so long as it is copolymerizable with chloroprene. For example, 1,3-butadiene, isoprene, 2,3-dichlorobutadiene or styrene may be mentioned. These monomers may be used alone or in combination as a mixture of two or more of them.

When a mixture of chloroprene with a monomer is used, the content of the monomer other than chloroprene is preferably within a range not to impair the physical properties of the polychloroprene, for example, at most equimolar amount to the chloroprene.

In the present invention, specific examples of the ethylenically unsaturated carboxylic acid include acrylic acid, methacrylic acid, crotonic acid, fumaric acid, maleic acid, citraconic acid and glutaconic acid. These acids may be used alone or in combination as a mixture of two or more of them.

The amount of the ethylenically unsaturated carboxylic acid varies depending upon the type or the molecular weight of the unsaturated carboxylic acid, but it is preferably from 0.5 to 10 parts by weight, more preferably from 1 to 5 parts by weight, per 100 parts by weight of the chloroprene or the mixture of chloroprene with a monomer. If the amount of the ethylenically unsaturated carboxylic acid is less than 0.5 part by weight, no adequate adhesive strength or heat resistant strength tends to be obtained. On the other hand, if it exceeds 10 parts by weight, the stability tends to be low during the storage or blending of the latex.

In the present invention, as the glycol ether, a glycol monoether or a glycol diether may, for example, be mentioned. Examples of the glycol monoether in the present invention include ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, ethylene glycol mono-tert-butyl ether, 3-methoxy-1-butanol and 3-methyl-3-methoxy-1-butanol.

Examples of the glycol diether in the present invention include ethylene glycol dimethyl ether, ethylene glycol diethyl ether, diethylene glycol dimethyl ether, diethylene glycol diethyl ether, triethylene glycol dimethyl ether, triethylene glycol diethyl ether, propylene glycol dimethyl ether and propylene glycol dibutyl ether.

These glycol ethers may be used alone or in combination as a mixture of two or more of them.

The amount of the glycol ether is usually from 0.5 to 15 parts by weight, preferably from 2.0 to 10 parts by weight, per 100 parts by weight of the chloroprene or the mixture of chloroprene with a monomer. If the amount is less than 0.5 part by weight or more than 15 parts by weight, the contact property and the water resistance tend to be poor.

In the present invention, as the polyvinyl alcohol, one commonly used, may be employed, such as a polyvinyl alcohol having an average degree of polymerization of from 200 to 3,000 and a saponification degree of at least 70 mol %. Otherwise, the one copolymerized with other monomer such as acrylamide or maleic anhydride, or the one having a part of a polyvinyl alcohol chemically modified by carboxylation or sulfonation, may also be used.

The amount of the polyvinyl alcohol is usually from 0.5 to 10 parts by weight, preferably from 1 to 5 parts by weight, per 100 parts by weight of the chloroprene or the mixture of chloroprene with a monomer. If the amount of the polyvinyl alcohol is less than 0.5 part by weight, the emulsifying power tends to be inadequate, and formation of aggregates tends to occur frequently during the polymerization reaction. On the other hand, if it exceeds 10 parts by weight, the viscosity tends to increase during the polymerization reaction, whereby stirring will be hindered, or abnormal heat generation is likely to take place, whereby it will be difficult to conduct the polymerization under a stabilized condition, and further, the water resistance tends to be low.

The amount of the polyvinyl alcohol is very much related to the amount of the glycol ether. Namely, the glycol ether itself also has an emulsifying power. Therefore, in a system where the glycol ether is used in a large amount, the emulsion stability can be maintained with a small amount of the polyvinyl alcohol. And, in such a case, there will be an improved effect for the water resistant adhesive property due to the reduced amount of the polyvinyl alcohol. On the other hand, in a system where the glycol ether is used in a small amount, it is not proper to minimize the amount of the polyvinyl alcohol to maintain the emulsion stability.

The method of the present invention may be carried out, for example, by adding to an aqueous solution of a polyvinyl alcohol, chloroprene or a mixture of chloroprene with a monomer, an ethylenically unsaturated carboxylic acid, a glycol ether as well as a molecular weight controlling agent (a chain transfer agent of various types), a polymerization initiator, etc., and stirring the resulting mixture while maintaining it at a constant temperature to conduct emulsion polymerization under an inert atmosphere to obtain a polychloroprene latex. Further, a pH controlling agent may be present in the polymerization system, as the case requires.

To the polychloroprene latex obtained by the present invention, a surfactant such as a fatty acid alkanolamide, or a resin emulsion which is commonly used, may be added. A typical example of such a resin emulsion is the one having a rosin-type resin (resin derived from rosin ether, hydrogenated rosin or polymerized rosin), a terpene-type resin, a phenol-type resin, a cumarone-indene resin, an aliphatic hydrocarbon resin or an aromatic petroleum-type resin dispersed in water by means of an anionic or nonionic emulsifier or dispersant. Such a resin emulsion may be the one having a single resin dispersed in water or the one having a plurality of resins dispersed in water.

Further, to the polychloroprene latex obtained by the present invention, additives commonly used for latexes, such as an antioxidant, a film-forming agent, a metal oxide, a vulcanizer and a thickener, may optionally be incorporated. Such additives may be blended by means of any one of mixing machines which are commonly used for blending latexes.

The polychloroprene latex obtained by the present invention is suitable for use as an adhesive for bonding objects of the same type or different types such as papers, woods, cloths, leathers, rubbers, plastics, plastic foams, porcelains, glasses, ceramics and metals.

Now, the present invention will be described in further detail with reference to Examples. However, it should be understood that the present invention is by no means restricted to such specific Examples.

EXAMPLE 1

Into a 3 l four-necked flask, 40 parts by weight of a polyvinyl alcohol (Denka Poval B-05, average degree of polymerization: 550, saponification degree: 88%) and 950 parts by weight of pure water were introduced, heated (60° C.) and dissolved. This aqueous solution was cooled to about room temperature, then 970 parts by weight of chloroprene, 30 parts by weight of methacrylic acid, 25 parts by weight of 3-methyl-3-methoxy-1-butanol and 3 parts by weight of octyl mercaptan were added thereto.

This mixture was stirred (200 rpm) while maintaining it at 40° C., and an initiator (potassium persulfate/sodium anthraquinone-β-sulfonate) was added under a nitrogen stream to conduct polymerization to obtain a latex.

Then, a 20% diethanolamine aqueous solution was added in a proper amount thereto to adjust the pH to 7. Then, 30 parts by weight of an aqueous solution containing 20% by weight of a 1:2 mol type fatty acid alkanolamide (MODICOL N, manufactured by Diamond Shamrock Chemical Co.) was added thereto to obtain a polychloroprene latex of the present invention.

Then, with respect to this polychloroprene latex, the adhesive properties were evaluated by the following methods.

(1) Contact property (canvas/canvas)

On two sheets of canvas (cotton cloth having a length of 14 cm and a width of 2.5 cm), the latex was coated twice so that the total coated amount would be 350 g/m$^2$ (wet amount). In the first coating, one half of the predetermined amount was coated and then heated for 5 minutes in a Geer oven of 70° C. for drying, and in the second coating, the rest of the adhesive was coated, and this was again heated for 5 minutes in a Geer oven of 70° C. for drying. The coated sheets were taken out at room temperature and immediately bonded to each other by pressing them with a hand roller. Immediately after the bonding, they were peeled at a peeling speed of 100 mm/min, whereby an average value of the tensile loads was taken as the contact property (the initial adhesive strength).

(2) Contact property (veneer/veneer)

In the same manner, the polychloroprene latex was coated on two sheets of veneer and dried. Then, the coated sheets were bonded by applying a pressure of about 10 kg/cm$^2$ for about 30 seconds, and immediately thereafter, they were manually peeled, whereby the adhesive force was evaluated by five ratings (5 point: best, 4 point: good, 3 point: fair, 2 point: poor, 1 point: very poor). Further, the effective bond area at that time was visually evaluated.

(3) Adhesive strength (canvas/canvas)

A test specimen bonded as in (1) was aged at 23° C. for 7 days and then peeled at a peeling speed of 100 mm/min, whereby an average value of the tensile loads was taken as the adhesive strength.

(4) Water resistant adhesive strength (canvas/canvas)

A test specimen bonded as in (1) was aged at 23° C. for 7 days and further immersed in water for 2 days, and then it was peeled at a peeling speed of 100 mm/min, whereby an average value of the tensile loads was taken as the water resistant adhesive strength.

(5) Heat resistant creep (canvas/canvas)

At one end of the test specimen bonded as in (1), 200 g of a weight was attached, and the other end was secured at a ceiling, and the time until the canvas to which the weight was attached, was peeled and dropped in an atmosphere of 70° C. at 180° peeling, was measured.

EXAMPLE 2

A polychloroprene latex was prepared in the same manner as in Example 1 except that 200 parts by weight of chloroprene out of 970 parts by weight was replaced by 2,3-dichlorobutadiene, and the adhesive properties were evaluated.

EXAMPLE 3

A polychloroprene latex was prepared in the same manner as in Example 1 except that the amount of 3-methyl-3-methoxy-1-butanol was changed to 50 parts by weight, and the amount of the polyvinyl alcohol was changed to 35 parts by weight, and the adhesive properties were evaluated.

EXAMPLE 4

A polychloroprene latex was prepared in the same manner as in Example 1 except that the amount of 3-methyl-3-methoxy-1-butanol was changed to 50 parts by weight, and the amount of the polyvinyl alcohol was changed to 30 parts by weight, and the adhesive properties were evaluated.

EXAMPLE 5

A polychloroprene latex was prepared in the same manner as in Example 1 except that the amount of 3-methyl-3-methoxy-1-butanol was changed to 25 parts by weight, and the amount of the polyvinyl alcohol was changed to 25 parts by weight, and the adhesive properties were evaluated.

EXAMPLE 6

A polychloroprene latex was prepared in the same manner as in Example 1 except that the amount of 3-methyl-3-methoxy-1-butanol was changed to 25 parts by weight, and the amount of the polyvinyl alcohol was changed to 20 parts by weight, and the adhesive properties were evaluated.

EXAMPLE 7

A polychloroprene latex was prepared in the same manner as in Example 1 except that instead of 3-methyl-3-methoxy-1-butanol, the same amount of 3-methoxy-1-butanol was added, and the adhesive properties were evaluated.

EXAMPLE 8

A polychloroprene latex was prepared in the same manner as in Example 1 except that instead of 3-methyl-3-methoxy-1-butanol, the same amount of ethylene glycol monobutyl ether was added, and the adhesive properties were evaluated.

EXAMPLE 9

A polychloroprene latex was prepared in the same manner as in Example 1 except that instead of 3-methyl-3-methoxy-1-butanol, the same amount of ethylene glycol dimethyl ether was added, and the adhesive properties were evaluated.

EXAMPLE 10

A polychloroprene latex was prepared in the same manner as in Example 1 except that instead of 3-methyl-3-methoxy-1-butanol, the same amount of ethylene glycol dibutyl ether was added, and the adhesive properties were evaluated.

EXAMPLE 11

A polychloroprene latex was prepared in the same manner as in Example 1 except that instead of 3-methyl-3-methoxy-1-butanol, the same amount of triethylene glycol dimethyl ether was added, and the adhesive properties were evaluated.

COMPARATIVE EXAMPLE 1

A polychloroprene latex was prepared in the same manner as in Example 1 except that no 3-methyl-3-methoxy-1-butanol was added, and the adhesive properties were evaluated.

COMPARATIVE EXAMPLE 2

Emulsion polymerization was carried out in the same manner as in Comparative Example 1 except that the amount of the polyvinyl alcohol was changed to 20 parts by weight. However, the emulsification was poor, and aggregates precipitated during the polymerization.

COMPARATIVE EXAMPLE 3

A polychloroprene latex was prepared in the same manner as in Comparative Example 1 except that the amount of the polyvinyl alcohol was changed to 50 parts by weight, and the adhesive properties were evaluated.

The results of the above Examples 1 to 5 are shown in Table 1, the results of Examples 6 to 10 are shown in Table 2, and the results of Example 11 and Comparative Examples 1 to 3 are shown in Table 3.

TABLE 1

|  | Example 1 | Example 2 | Example 3 | Example 4 | Example 5 |
|---|---|---|---|---|---|
| Formulation for polymerization | | | | | |
| Chloroprene | 970 | 770 | 970 | 970 | 970 |
| 2,3-Dichlorobutadiene | — | 200 | — | — | — |
| Methacrylic acid | 30 | 30 | 30 | 30 | 30 |
| Octyl mercaptan | 3 | 3 | 3 | 3 | 3 |
| Polyvinyl alcohol[1] | 40 | 40 | 35 | 30 | 25 |
| Pure water | 950 | 950 | 950 | 950 | 950 |
| 3-Methyl-3-methoxy-1-butanol[2] | 25 | 25 | 50 | 50 | 25 |
| 3-Methoxy-1-butanol | — | — | — | — | — |
| Ethylene glycol monobutyl ether | — | — | — | — | — |
| Ethylene glycol dimethyl ether | — | — | — | — | — |
| Ethylene glycol dibutyl ether | — | — | — | — | — |

TABLE 1-continued

|  | Example 1 | Example 2 | Example 3 | Example 4 | Example 5 |
|---|---|---|---|---|---|
| Triethylene glycol dibutyl ether | — | — | — | — | — |
| Physical properties of the latex |  |  |  |  |  |
| Specific gravity | 1.095 | 1.098 | 1.089 | 1.098 | 1.089 |
| Mechanical stability (%)[3] | 0.0055 | 0.0056 | 0.0082 | 0.0080 | 0.0026 |
| Particle size (mm)[4] | 199 | 202 | 210 | 259 | 327 |
| Contact property (initial adhesion)[5] (canvas/canvas) (kg/cm) | 1.10 | 1.20 | 1.22 | 1.87 | 1.70 |
| Contact property (initial adhesion)[6] (veneer/veneer) 5 ratings | 5 point (100%) | 5 point (100%) | 5 point (100%) | 5 point (100%) | 5 point (100%) |
| Adhesive strength[7] (canvas/canvas) (kg/cm) | 2.6 | 4.1 | 2.2 | 2.8 | 2.3 |
| Water resistant adhesive strength[8] (canvas/canvas) (kg/cm) | 0.33 | 0.35 | 0.99 | 1.28 | 1.36 |
| Heat resistant creep[9] (Drop time) (canvas/canvas) (min) | at least 60 | at least 60 | at least 60 | at least 60 | at least 60 |

TABLE 2

|  | Example 6 | Example 7 | Example 8 | Example 9 | Example 10 |
|---|---|---|---|---|---|
| Formulation for polymerization |  |  |  |  |  |
| Chloroprene | 970 | 970 | 970 | 970 | 970 |
| 2,3-Dichlorobutadiene | — | — | — | — | — |
| Methacrylic acid | 30 | 30 | 30 | 30 | 30 |
| Octyl mercaptan | 3 | 3 | 3 | 3 | 3 |
| Polyvinyl alcohol[1] | 20 | 40 | 40 | 40 | 40 |
| Pure water | 950 | 950 | 950 | 950 | 950 |
| 3-Methyl-3-methoxy-1-butanol[2] | 25 | — | — | — | — |
| 3-Methoxy-1-butanol | — | 25 | — | — | — |
| Ethylene glycol monobutyl ether | — | — | 25 | — | — |
| Ethylene glycol dimethyl ether | — | — | — | 25 | — |
| Ethylene glycol dibutyl ether | — | — | — | — | 25 |
| Triethylene glycol dibutyl ether | — | — | — | — | — |
| Physical properties of the latex |  |  |  |  |  |
| Specific gravity | 1.098 | 1.096 | 1.095 | 1.096 | 1.096 |
| Mechanical stability (%)[3] | 0.0097 | 0.0093 | 0.0060 | 0.0030 | 0.0085 |
| Particle size (mm)[4] | 389 | 201 | 209 | 202 | 208 |
| Contact property (initial adhesion)[5] (canvas/canvas) (kg/cm) | 1.69 | 1.20 | 1.25 | 1.80 | 2.30 |
| Contact property (initial adhesion)[6] (veneer/veneer) 5 ratings | 5 point (100%) | 5 point (100%) | 5 point (100%) | 5 point (100%) | 5 point (100%) |
| Adhesive strength[7] (canvas/canvas) (kg/cm) | 2.2 | 2.8 | 2.8 | 3.6 | 3.9 |
| Water resistant adhesive strength[8] (canvas/canvas) (kg/cm) | 1.08 | 0.32 | 0.33 | 1.48 | 1.85 |
| Heat resistant creep[9] (Drop time) (canvas/canvas) (min) | at least 60 | at least 60 | at least 60 | at least 60 | at least 60 |

TABLE 3

|  | Example 11 | Comparative Example 1 | Comparative Example 2 | Comparative Example 3 |
|---|---|---|---|---|
| Formulation for polymerization |  |  |  |  |
| Chloroprene | 970 | 970 | 970 | 970 |
| 2,3-Dichlorobutadiene | — | — | — | — |
| Methacrylic acid | 30 | 30 | 30 | 30 |
| Octyl mercaptan | 3 | 3 | 3 | 3 |
| Polyvinyl alcohol[1] | 40 | 40 | 20 | 50 |
| Pure water | 950 | 950 | 950 | 950 |
| 3-Methyl-3-methoxy-1-butanol[2] | — | — | — | — |
| 3-Methoxy-1-butanol | — | — | — | — |
| Ethylene glycol monobutyl ether | — | — | — | — |
| Ethylene glycol dimethyl ether | — | — | — | — |
| Ethylene glycol dibutyl ether | — | — | — | — |
| Triethylene glycol dibutyl ether | 25 | — | — | — |
| Physical properties of the latex |  |  |  |  |
| Specific gravity | 1.097 | 1.094 | Stable polymerization impossible | 1.096 |
| Mechanical stability (%)[3] | 0.0062 | 0.0056 |  | 0.0020 |
| Particle size (mm)[4] | 196 | 217 |  | 140 |
| Contact property (initial adhesion)[5] (canvas/canvas) (kg/cm) | 1.10 | 1.06 | — | 1.00 |
| Contact property (initial adhesion)[6] (veneer/veneer) 5 ratings | 5 point (100%) | 3 point (30%) | — | 2 point (10%) |
| Adhesive strength[7] (canvas/canvas) (kg/cm) | 3.2 | 2.4 | — | 2.4 |
| Water resistant adhesive strength[8] (canvas/canvas) (kg/cm) | 1.82 | 0.27 | — | 0 |
| Heat resistant creep[9] (Drop time) (canvas/canvas) (min) | at least 60 | 36 | — | 40 |

Notes in the Tables

1) Polyvinyl alcohol: Denka-Poval B-05 (average degree of polymerization: 550, saponification degree: 88%)

2) 3-Methyl-3-methoxy-1-butanol: SOLFIT (KURARAY Co., Ltd.)

3) Mechanical stability: Maron type stability tester (10 kg, 1000 rpm, 10 min)

4) Particle size: particle size measuring apparatus (Submicron Particle Analyzer model 4/COULTER ELECTRONICS.)

5) Contact property (canvas/canvas): coated amount: 350 g/m² (wet amount, coated twice with a half amount each time), open time: 70° C., 5 min, bonding: press bonding by a hand roller, measurement of the adhesive force: immediately after the bonding, the peeling load at a peeling speed of 100 mm/min was measured.

6) Contact property (veneer/veneer): coated amount: 200 g/m² (wet amount, the total amount was coated all at once), open time: 70° C., 5 min, bonding: press bonded under a pressure of about 10 kg/m². Immediately after the bonding, the bonded test specimen was manually peeled, whereby the adhesive force was evaluated by five ratings. Further, the proportion of the effective adhesive area of the adhesive failure surface was visually measured and shown in a bracket.

7) Adhesive strength (canvas/canvas): coated amount: 350 g/m² (wet amount, coated twice with a half amount each time), open time: 70° C., 10 min, bonding: press bonding by a hand roller, measurement of the adhesive force: upon expiration of 7 days (23° C., 50 RH %) after the bonding, the peeling load at a peeling speed of 100 mm/min was measured.

8) Water resistant adhesive strength (canvas/canvas): the test specimen as in 7) was further immersed in water for 2 days, whereupon the peeling load was measured.

9) Heat resistant creep (canvas/canvas): the same test specimen as used for the measurement of the adhesive strength was employed. At one end of this bonded test specimen, a weight of 200 g was attached and suspended in an atmosphere of 70° C., whereby the time until the weight dropped, was measured.

What is claimed is:

1. A method for producing a polychloroprene latex which consists essentially of:

copolymerizing chloroprene and at least one ethylenically unsaturated carboxylic acid in the presence of a polyvinyl alcohol and glycol ether, wherein from 0.5 to 10 parts by weight of the ethylenically unsaturated carboxylic acid, from 0.5 to 10 parts by weight of the polyvinyl alcohol and from 0.5 to less than 10 parts by weight of the glycol ether are present in the reaction medium per 100 parts by weight of the chloroprene, thereby preparing said latex which can be directly applied as an adhesive to a substrate.

2. A method for producing a polychloroprene latex, which consists essentially of:

copolymerizing chloroprene and at least one ethylenically unsaturated carboxylic acid in the present of a polyvinyl alcohol and a glycol ether, wherein from 0.5 to 10 parts by weight of the ethylenically unsaturated carboxylic acid selected from the group consisting of acrylic acid, methacrylic acid, crotonic acid, fumaric acid, maleic acid, citraconic acid and glutaconic acid, from 0.5 to 10 parts by weight of the polyvinyl alcohol and from 0.5 to less than 10 parts by weight of the glycol ether are present in the reaction medium per 100 parts by weight of the chloroprene, thereby preparing said latex which can be directly applied as an adhesive to a substrate.

3. The method for producing a polychloroprene latex according to claim 1, wherein the ethylenically unsaturated carboxylic acid is at least one member selected from the group consisting of acrylic acid, methacrylic acid, crotonic acid, fumaric acid, maleic acid, citraconic acid and glutaconic acid.

4. The method for producing a polychloroprene latex according to claim 1, wherein the ethylenically unsaturated carboxylic acid is methacrylic acid.

5. The method for producing a polychloroprene latex according to claim 1, wherein the polyvinyl alcohol has an average degree of polymerization of from 200 to 3,000 and a saponification degree of at least 70 mol %.

6. The method for producing a polychloroprene latex according to claim 1, wherein the glycol ether is a glycol monoether.

7. The method for producing a polychloroprene latex according to claim 6, wherein the glycol monoether is at least one member selected from the group consisting of 3-methyl-3-methoxy-1-butanol, 3-methoxy-1-butanol, ethylene glycol monobutyl ether and ethylene glycol mono-tert-butyl ether.

8. The method for producing a polychloroprene latex according to claim 1, wherein the glycol ether is a glycol diether.

9. The method for producing a polychloroprene latex according to claim 8, wherein the glycol diether is at least one member selected from the group consisting of ethylene glycol dimethyl ether, ethylene glycol dibutyl ether and triethylene glycol dibutyl ether.

10. The method for producing a polychloroprene latex according to claim 1, wherein the chloroprene contains at most equimolar amount of 2,3-dichlorobutadiene.

* * * * *